US010364838B2

(12) United States Patent
Parker et al.

(10) Patent No.: US 10,364,838 B2
(45) Date of Patent: Jul. 30, 2019

(54) BOOT FOR A SOCKET ASSEMBLY

(71) Applicant: Federal-Mogul Motorparts Corporation, Southfield, MI (US)

(72) Inventors: Glen C. Parker, St. Peters, MO (US); Eric M. Kopsie, Bethalto, IL (US); Thomas J. Byrnes, Jr., St. Charles, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 503 days.

(21) Appl. No.: 15/077,444

(22) Filed: Mar. 22, 2016

(65) Prior Publication Data
US 2017/0276169 A1 Sep. 28, 2017

(51) Int. Cl.
F16C 11/06 (2006.01)
B60G 7/00 (2006.01)
F16J 3/04 (2006.01)

(52) U.S. Cl.
CPC .......... *F16C 11/0676* (2013.01); *B60G 7/005* (2013.01); *F16C 11/068* (2013.01); *F16C 11/0671* (2013.01); *F16J 3/046* (2013.01); *B60G 2204/416* (2013.01); *B60G 2204/43* (2013.01); *F16C 2326/05* (2013.01)

(58) Field of Classification Search
CPC ............... Y10T 403/31; Y10T 403/315; Y10T 403/32729
See application file for complete search history.

(56) References Cited

U.S. PATENT DOCUMENTS

| | | | | |
|---|---|---|---|---|
| 2,559,857 A | * | 7/1951 | Edwards | F16C 11/0604 285/910 |
| 3,175,834 A | * | 3/1965 | Wallace | B60G 7/005 277/635 |
| 3,208,779 A | | 9/1965 | Sullivan, Jr. | |
| 3,248,955 A | * | 5/1966 | Templeton | B60G 7/005 277/635 |
| 3,279,834 A | | 10/1966 | Budzynski | |

(Continued)

FOREIGN PATENT DOCUMENTS

| | | |
|---|---|---|
| FR | 2771148 A1 | 5/1999 |
| GB | 1000622 A | 8/1965 |
| WO | 2016014190 A1 | 1/2016 |

OTHER PUBLICATIONS

International Search Report, dated Jun. 26, 2017 (PCT/US2017/023280).

*Primary Examiner* — Michael P Ferguson
(74) *Attorney, Agent, or Firm* — Robert L. Stearns; Dickinson Wright, PLLC

(57) ABSTRACT

The improved dust boot includes a dust boot body which is made as one integral piece of an elastomeric material and extends from a first end portion to a second end portion. The second end portion of the dust boot body includes a first sealing portion and a second sealing portion which is spaced from the first sealing portion. The first sealing portion includes a plurality of ribs that are spaced circumferentially from one another by a plurality of grooves and includes a plurality of relief valves that are located in the grooves and extend away from the first end portion for allowing a lubricant to pass the first sealing portion in one direction and for restricting the passage of contaminants past the sealing portion in an opposite direction.

11 Claims, 4 Drawing Sheets

(56) References Cited

U.S. PATENT DOCUMENTS

| | | | |
|---|---|---|---|
| 3,451,700 A * | 6/1969 | Smith | B62D 7/16 |
| | | | 277/391 |
| 3,476,417 A | 11/1969 | Born et al. | |
| 3,596,915 A | 8/1971 | Snider | |
| 4,121,844 A * | 10/1978 | Nemoto | F16C 11/0671 |
| | | | 277/635 |
| 4,154,546 A | 5/1979 | Merrick et al. | |
| 4,241,928 A | 12/1980 | Nemoto et al. | |
| 6,308,959 B1 | 10/2001 | Sokolihs et al. | |
| 6,334,620 B1 | 1/2002 | Reetz et al. | |
| 6,834,863 B2 * | 12/2004 | Urbach | F16C 11/0671 |
| | | | 277/555 |
| 7,704,007 B2 * | 4/2010 | Elterman | F16D 3/845 |
| | | | 277/635 |
| 8,414,215 B2 | 4/2013 | Langendoen | |
| 2016/0025129 A1 | 1/2016 | Parker et al. | |

* cited by examiner

BOOT FOR A SOCKET ASSEMBLY

BACKGROUND OF THE INVENTION

1. Field of the Invention

The present invention is related, generally, to dust boots for use in socket assemblies, such as ball joints.

2. Related Art

Socket assemblies, such as ball joints, typically include a housing with an inner bore and a stud which is partially received in the inner bore and extends outwardly therefrom. The housing is adapted for connection with one component, such as a knuckle of a vehicle suspension system. The stud is adapted for attachment with another component, such as a control arm. Such socket assemblies generally include one or more bearings which provide a low friction interface with the stud to allow the stud to rotate and articulate relative to the housing.

Socket assemblies typically include one or more boots that are sealed against the housing and against the stud for retaining a lubricant within the socket assembly to facilitate the rotation and articulation between the housing and the stud. Many dust boots are provided with single grease relief passage for allowing grease to escape out of the socket assembly when the grease is initially injected into the socket assembly and during routine maintenance of the socket assembly.

SUMMARY OF THE INVENTION AND ADVANTAGES

One aspect of the present invention is an improved dust boot for a socket assembly. The dust boot includes a dust boot body which is made as one integral piece of an elastomeric material and extends from a first end portion to a second end portion. The second end portion of the dust boot body includes a first sealing portion and a second sealing portion which is spaced from the first sealing portion. The first sealing portion includes a plurality of ribs that are spaced circumferentially from one another by a plurality of grooves and includes a plurality of relief valves that are located in the grooves and extend away from the first end portion for allowing a lubricant to pass the first sealing portion in one direction and for restricting the passage of contaminants past the sealing portion in an opposite direction.

The dust boot is advantageous because the multiple grooves of the first sealing feature allow an increased volumetric flow rate of grease (or any suitable lubricant) to be injected into a socket assembly to which the dust boot is affixed during initial greasing and regreasing without damaging the dust boot or other components of the socket assembly. Additionally, the use of multiple grooves allows for the lubrication of the entire surface-to-surface contact between the dust boot body and a stud during rotation and articulation which in turn reduces torsional stresses in the dust boot body and results in less restriction to the rotation and articulation of the ball stud.

According to another aspect of the present invention, the ribs are angled radially inwardly when the dust boot body is in a resting condition and an outer surface of the dust boot body in line with the ribs is generally cylindrical in shape. This configuration allows for the use of more simple molding with a solid core to make the dust boot body through an injection molding process.

According to yet another aspect of the present invention, a Belleville washer is at least partially overmolded in the first end portion of the dust boot body. The Belleville washer may apply a biasing force against one or more components in the socket assembly.

According to still another aspect of the present invention, the second sealing feature extends three hundred and sixty degrees around an axis.

Another aspect of the present invention is related to a socket assembly. The socket assembly includes a housing with an inner bore. A stud is partially received in the inner bore and extends outwardly therefrom. A dust boot extends from a first end portion that is sealed against the housing to a second end portion. The dust boot further includes a first sealing feature which has a plurality of circumferentially spaced ribs that are in surface-to-surface contact with the stud and has a plurality of circumferentially spaced grooves which separate the ribs. The first sealing feature additionally includes a plurality of relief valves which are positioned in the grooves and are sealed against the stud and extend axially away from the housing for allowing a lubricant to pass the first sealing feature in one direction and for restricting the passage of contaminants in an opposite direction. The dust boot further includes a second sealing feature which is spaced from the first sealing feature for sealing against a vehicle suspension component.

According to yet another aspect of the present invention, the stud is a ball stud with a ball portion that is received in the inner bore of the housing and with a shank portion which projects out of the housing.

According to still another aspect of the present invention, the shank portion includes a tapered section, and the firs sealing portion of the dust boot is sealed against the tapered section.

According to a further aspect of the present invention, the second sealing feature extends three hundred and sixty degrees around the axis.

According to yet a further aspect of the present invention, the dust boot includes a dust boot body which is made as one integral piece of an elastomeric material.

According to still a further aspect of the present invention, the dust boot includes a dust boot body which is made as a single integral piece of an elastomeric material.

According to another aspect of the present invention, the dust boot further includes a Belleville washer at least partially overmolded within the first end portion of the dust boot body.

Another aspect of the present invention is for a vehicle suspension system. The suspension system includes a first suspension component and a separate second component which has an opening and a generally planar surface around the opening. The vehicle suspension system further includes a socket assembly with a housing which is operably connected with the first suspension component and has an inner bore. A stud extends along an axis out of the inner bore and is operably connected with the control arm. A dust boot extends from a first end portion that is sealed against the housing to a second end portion. The dust boot includes a first sealing feature which has a plurality of circumferentially spaced ribs that are in surface-to-surface contact with the stud and has a plurality of circumferentially spaced grooves separating the ribs. The first sealing feature further includes a plurality of relief valves positioned in the grooves and sealed against the stud and extending axially away from the first suspension component for allowing a lubricant to pass the first sealing feature in one direction and for restricting the passage of contaminants in an opposite direction. The dust boot further includes a second sealing feature which is spaced from the first sealing feature and is sealed against the generally planar surface of the second suspension component.

According to another aspect of the present invention, the stud is a ball stud with a ball portion that is received in the inner bore of the housing and a shank portion which projects out of the housing.

According to yet another aspect of the present invention, the shank portion has a tapered section, and the first sealing portion of the dust boot is sealed against the tapered section.

According to still another aspect of the present invention, the first suspension component is a knuckle, and the second suspension component is a control arm.

According to a further aspect of the present invention, the second sealing feature is sealed against the second suspension component three hundred and sixty degrees around the axis.

According to yet a further aspect of the present invention, the dust boot includes a dust boot body which is made as one integral piece of an elastomeric material.

According to still a further aspect of the present invention, the dust boot further includes a Belleville washer at least partially overmolded in the first end portion of the dust boot body.

According to another aspect of the present invention, the second sealing feature includes a lip and a notch formed into the lip for allowing a lubricant to escape the socket assembly during greasing and regreasing.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF THE ENABLING EMBODIMENT

Figure 1:
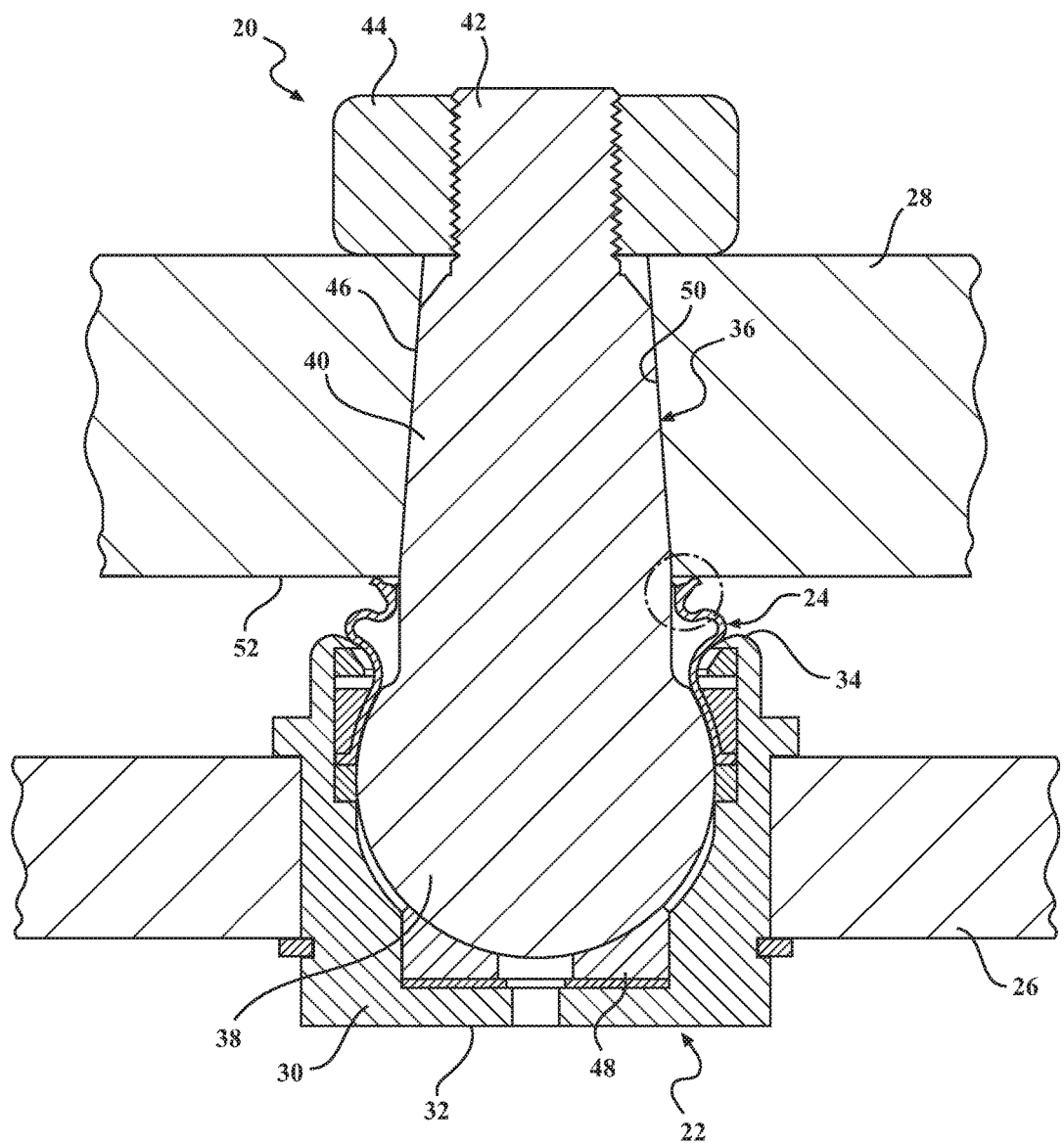
FIG. 1 is a cross-sectional view showing a socket assembly with an improved dust boot constructed according to an aspect of the present invention connecting a knuckle with a control arm of a vehicle suspension system.
Figure 2:
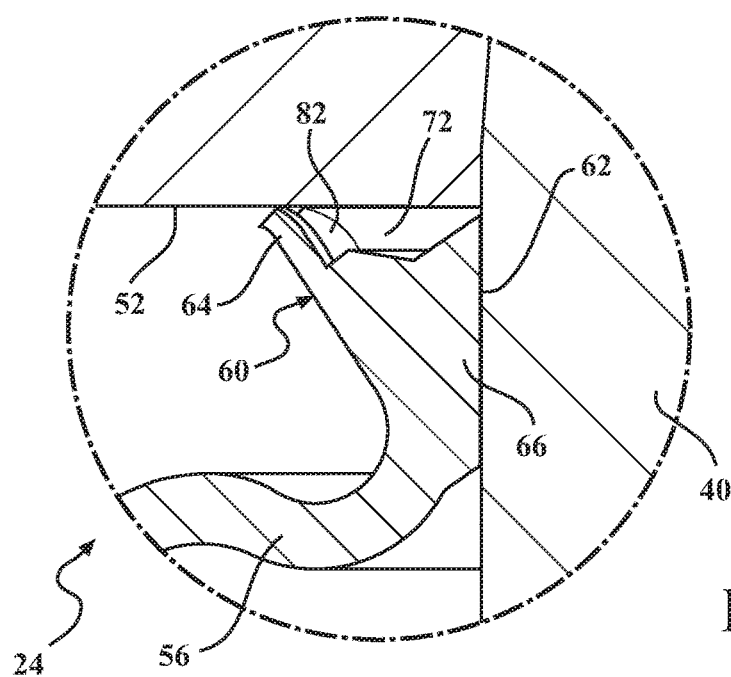
FIG. 2 is an enlarged view of a portion of FIG. 1.
Figure 3:
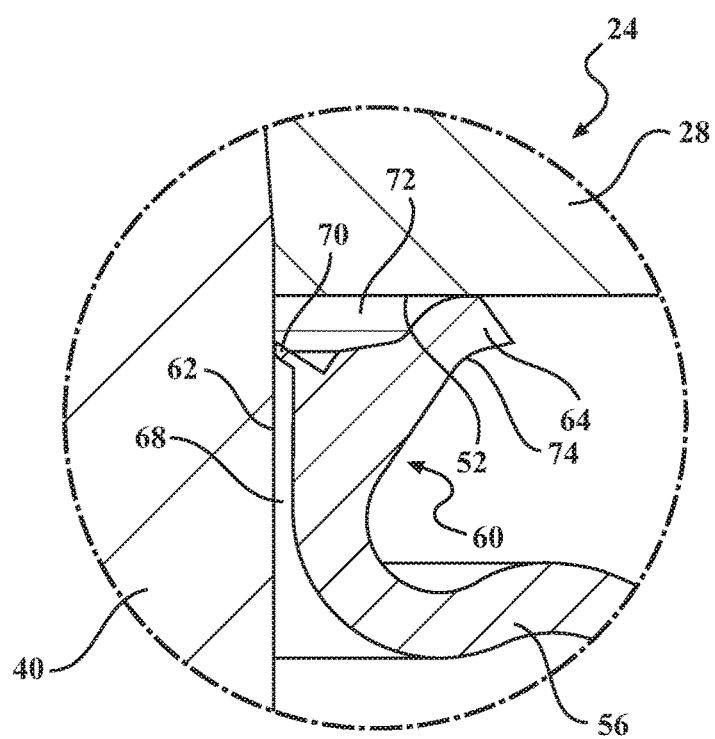
FIG. 3 is an enlarged view of another portion of FIG. 1.
Figure 4:
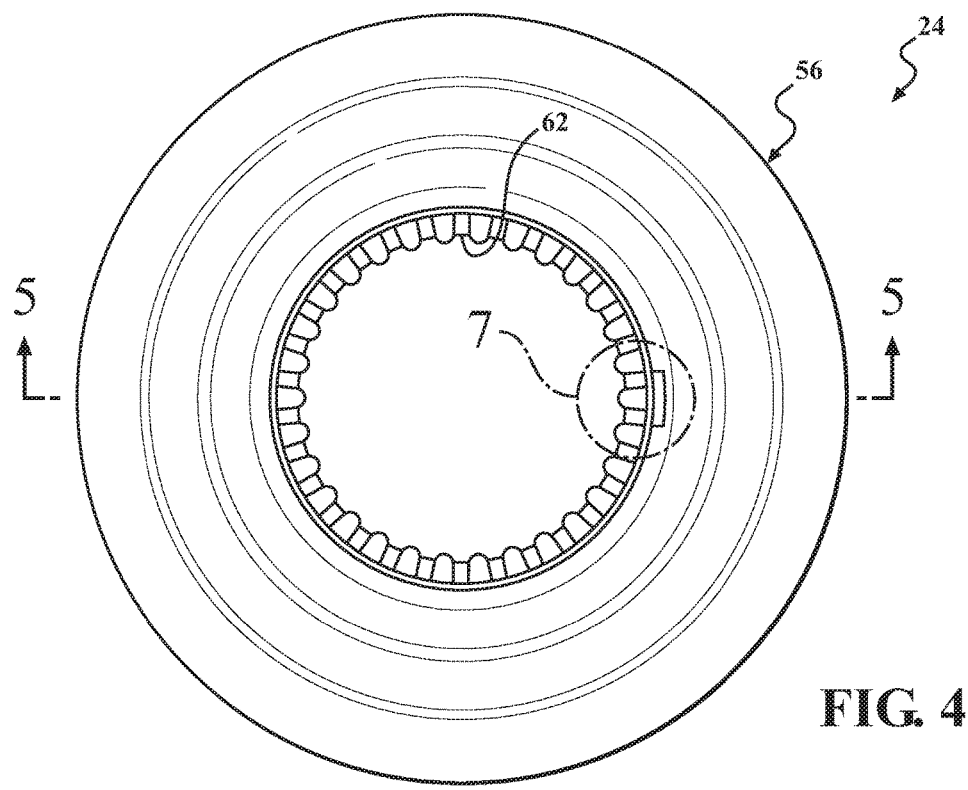
FIG. 4 is a perspective and elevation view of the dust boot of the socket assembly shown in FIG. 1.

Referring to the Figures, wherein like numerals indicate corresponding parts throughout the several views, a vehicle suspension assembly 20 including a socket assembly 22 with an improved dust boot 24 is generally shown in FIGS. 1-3. The improved dust boot 24 is adapted to allow a high flow of lubricant (such as grease) to escape an interior of the socket assembly 22 during manufacture of the socket assembly 22 and during routine maintenance and also retain a desirable amount of lubricant within the socket assembly 22 and keep contaminants (such as salt, water or dirt) out of socket assembly 22 during use. In the exemplary embodiment, the socket assembly 22 is a ball joint. However, it should be appreciated that the socket assembly could take a range of different configurations.

As shown in FIG. 1, the vehicle suspension system 20 includes a first suspension component and a second suspension component which are operably connected together via the socket assembly 22 which is configured to allow relative movement between the first and second suspension components. Specifically, in the exemplary embodiment, the first suspension component is a knuckle 26, and the second suspension component is a control arm 28. However, it should be appreciated that the socket assembly 22 with the improved dust boot 24 could be adapted to connect a range of different automotive or non-automotive components.

The socket assembly 22 includes a housing 30 which is operably connected with the knuckle 26. In the exemplary embodiment, the housing 30 is a cartridge which is press-fit into an opening in the knuckle 26. However, it should be appreciated that the housing 30 could be attached with the knuckle 26 through any suitable means or could be integrally connected with the knuckle 26. The housing 30 presents an inner bore which, in the exemplary embodiment, extends along an axis A from a closed lower end 32 to an open upper end 34.

The socket assembly 22 further includes a ball stud 36 which is partially received within the inner bore of the housing 30. Specifically, the ball stud 36 includes a ball portion 38 that is fully received in an inner bore of the housing 30 and a shank portion 40 which projects out of the inner bore through the open upper end 34. The shank portion 40 extends from the ball portion 38 to a threaded end 42 for receiving a nut 44. In the exemplary embodiment, the shank portion 40 of the ball stud 36 includes a tapered section 46 which tapers radially inwardly from the ball portion 38 to the threaded end 42 at a generally constant angle. That is, as viewed in cross-section, an outer wall of the tapered section 46 is angled inwardly towards the axis A from the ball portion 38 to the threaded end 42. The socket assembly 22 further includes a bearing 48 which is disposed within the inner bore of the housing and has a low friction bearing surface that slidably supports the ball portion 38 of the ball stud 36 for allowing the ball stud 36 and the housing 30 to articulate and rotate relative one another during operation of the suspension assembly 20.

The control arm 28 includes an opening 50 and a generally planar surface 52 that surrounds the opening 50 and faces towards the knuckle 26. The generally planar surface 52 could be a part of a single piece control arm body 24 or it could be a separate piece, such as an adapter, which is inserted into a larger aperture of the control arm body 24. In the exemplary embodiment, the opening 50 of the control arm 28 is generally frusto-conical in shape with an inner periphery that is tapered at a similar angle to the tapered section 46 of the shank portion 40 of the ball stud 36. The shank portion 40 of the ball stud 36 extends through the opening 40 of the control arm 28 such that the outer wall of the tapered section 46 of the shank portion 40 is in surface-to-surface contact with the inner periphery of the opening 50. In the exemplary embodiment, the nut 44 is attached with the threaded end 42 of the shank portion 40 to lock the ball stud 36 into engagement with the control arm 28. However, it should be appreciated that any suitable means may be employed to lockingly connect the ball stud 36 with the control arm 28.

In the exemplary embodiment, the dust boot 24 includes a dust boot body 56 which is made as one integral piece of a flexible material (such as rubber) and extends from a first end portion 58 to a second end portion 60. Between the first and second end portions 58, 60, an intermediate portion of the dust boot body 56 has a generally constant wall thickness. The first end portion 58 is sealed against the housing 30, and the second end portion 60 is sealed against both the ball stud 36 and against the control arm 54. Specifically, the second end portion 60 of the dust boot body 56 includes first and second sealing features 62, 64 which are spaced both axially and radially from one another.

Figure 5:
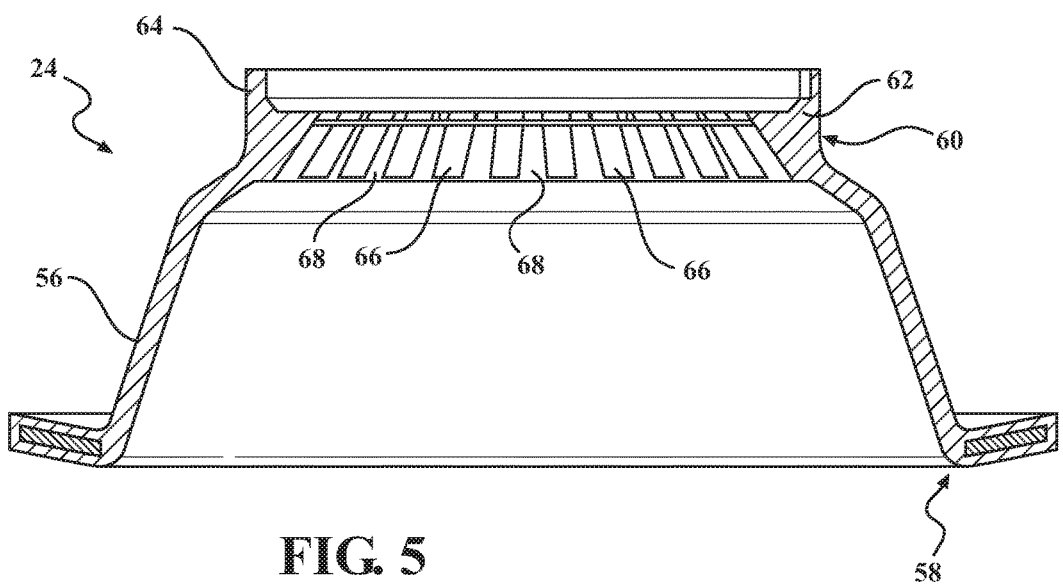
FIG. 5 is a cross-sectional view of the dust boot shown in FIG. 4.
Figure 6:
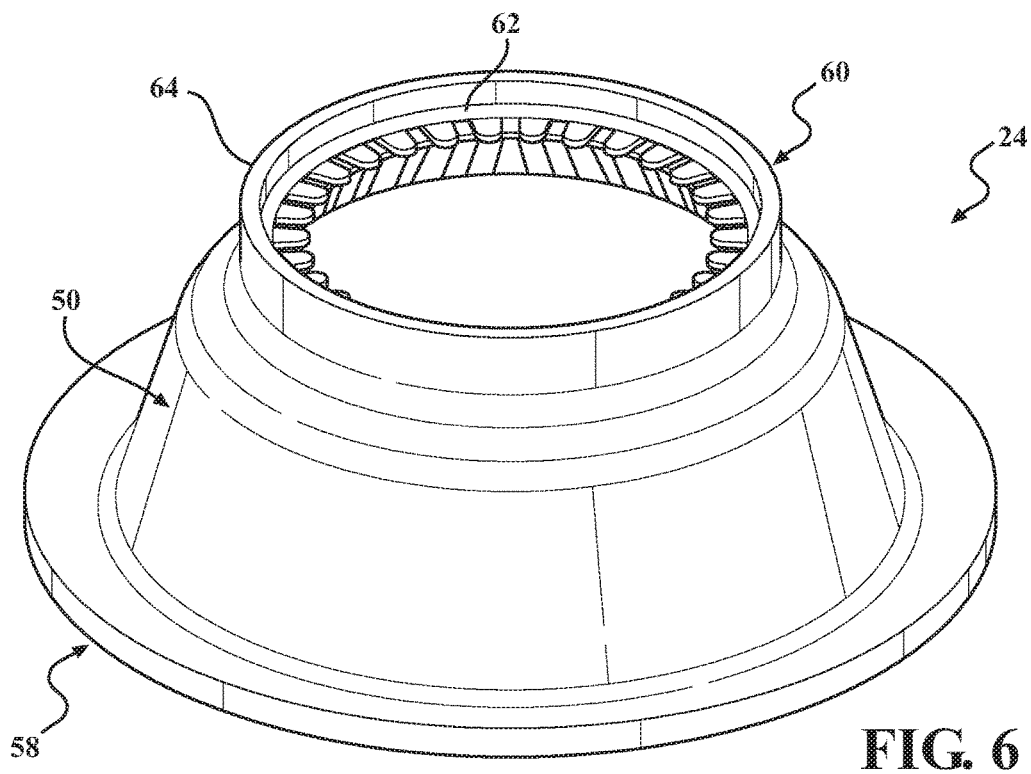
FIG. 6 is a top view of the dust boot shown in FIG. 4.
Figure 7:
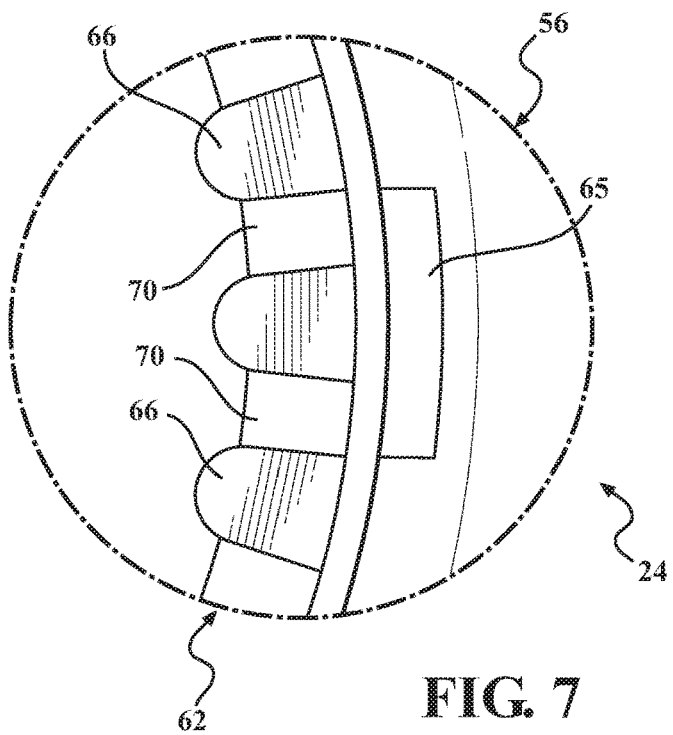
FIG. 7 is an enlarged view of a portion of FIG. 6.

As shown in FIGS. 3 and 5, the first sealing feature 62 includes a plurality of axially extending ribs 66 which are spaced circumferentially from one another by a plurality of axially extending grooves 68. The ribs 66 are pressed in surface-to-surface contact with the tapered section 46 of the shank portion 40 of the ball stud 36 to establish fluid tight seals against the shank portion 40. The grooves 68 allow the passage of grease (or any suitable lubricant) past the first sealing feature 62 during initial greasing and re-greasing processes. Within each of the grooves 68, the first sealing feature 62 also includes a grease relief valve 70 in the form of a projection which extends radially inwardly to directly contact the shank portion 40 of the ball stud 36 to establish a seal against the ball stud 36. Additionally, each of the grease relief valves 70 is angled axially upwardly away from the housing 22 and towards the threaded end 42 of the shank portion 40. The angles of the grease relief valves 70 allows the grease relief valves 70 to function as check valves in that they allow grease to pass through the first sealing feature 62 in one axial direction during greasing and re-greasing but prevent contaminants from passing the first sealing feature 62 in an opposite axial direction. In the exemplary embodiment, the first sealing feature 62 is provided with approximately 30 ribs 66 and 30 grooves 68. The multitude of the grooves 68 and the circumferential spacing of the grooves 68 advantageously allows for lubrication of the entire circumference of the surface-to-surface contact between the dust boot body 56 and the ball stud 36 to reduce friction between therebetween and to reduce the torsional stiffness in the dust boot body 56. As such, the overall restriction to the rotation and articulation of the ball stud 36 relative to the housing 30 is reduced.

The second sealing feature 64 includes a lip 64 which extends circumferentially around the axis A to establish a three hundred and sixty degree (360) fluid-tight seal against the generally planar lower surface 52 of the control arm 28. In the exemplary embodiment, the lip 64 is angled relative to the axis A and is curved by the connection with the generally planar lower surface 52. Preferably, the lip 64 is provided with one or more notches 65 formed on an interior surface thereof for allowing grease to escape out of the socket assembly 22 during greasing and regreasing.

As shown in FIGS. 2 and 3, when the dust boot 24 is sealed against the ball stud 36 and the control arm 28, the first and second sealing features 62, 64 are spaced from one another to present a grease channel 72 which extends three hundred and sixty degrees (360) around the axis A. Once greasing is completed, the grease channel 72 remains full of grease during operation of the vehicle suspension assembly 20 (shown in FIG. 1).

Referring now to FIG. 5, when the dust boot 24 is in a relaxed condition pre-assembly condition, the ribs 66 of the first sealing feature 62 are angled radially inwardly at a much greater angle than they are when the dust boot 24 is in the installed condition shown in FIGS. 1-3. That is, in the uninstalled free condition, an inside diameter of the dust boot 25 is the smallest at the tops of the ribs 66. Likewise, when the dust boot 24 is in the relaxed condition, an outer surface 74 of the second end portion 60 with the first and second sealing features 62, 64 is generally cylindrical in shape, i.e., the outer surface 74 is straight or parallel with the axis A. It has been found that having the ribs 66 angle inwardly and having the straight outer wall 74 allows the use of a more simply shaped mold with a solid core, which reduces the complexity and cost of the molding equipment required to injection mold the dust boot body 56.

The terms "upper" and "lower" as used herein are in reference to the orientations of the various components in the Figures, and these terms are not intended to require a particular orientation or otherwise be limiting.

Obviously, many modifications and variations of the present invention are possible in light of the above teachings and may be practiced otherwise than as specifically described while within the scope of the appended claims.

What is claimed is:

1. A vehicle suspension system, comprising:
a first suspension component;
a second suspension component having an opening and a generally planar surface around said opening;
a socket assembly including a housing which is operably connected with said first suspension component and has an inner bore;
said socket assembly further including a stud which extends along an axis out of said inner bore of said housing and is operably connected with said second suspension component, said stud comprising a ball stud with a ball portion that is received in said inner bore of said housing and a shank portion having a tapered section which projects out of said housing;
a dust boot extending from a first end portion that is sealed against said housing of said socket assembly to a second end portion;
said second end portion of said dust boot being made as a monolithic piece of a flexible material and including a first sealing feature and a second sealing feature;
said flexible material of said first sealing feature having a plurality of circumferentially spaced axially extending ribs that are in direct surface-to-surface contact with and sealed against said tarped section of said shank portion of said stud and having a plurality of circumferentially spaced axially extending grooves separating said ribs, and wherein a lubricant can flow through said grooves between said flexible material of said dust boot and said stud;
said first sealing feature further including a plurality of circumferentially spaced radially inwardly extending relief valves, each positioned in a respective one of said grooves and sealed against said stud and extending at oblique angles relative to said axis and axially away from said first suspension component to contact said stud for allowing the lubricant to pass said first sealing feature in one direction and for restricting the passage of contaminants in an opposite direction; and
said second sealing feature comprising a circumferential lip which is spaced from said first sealing feature and is sealed against said generally planar surface of said second suspension component.

2. The vehicle suspension system as set forth in claim 1 wherein said first suspension component is a knuckle and said second suspension component is a control arm.

3. The vehicle suspension system as set forth in claim 1 wherein said second sealing feature is sealed against said second suspension component three hundred and sixty degrees around said axis.

4. The vehicle suspension system as set forth in claim 1 wherein said dust boot includes a dust boot body which is made as one integral piece of an elastomeric material.

5. The vehicle suspension system as set forth in claim 4 wherein said dust boot further includes a Belleville washer at least partially overmolded in said first end portion of said dust boot body.

6. The vehicle suspension system as set forth in claim 1 wherein said second sealing feature includes a notch formed in said lip for allowing a lubricant to escape said socket assembly during greasing and regreasing.

7. A socket assembly, comprising:
a housing with an inner bore;
a stud partially received in sad inner bore and extending outwardly therefrom and extending along an axis, said stud comprising a ball stud with a ball portion that is received in said inner bore of said housing and a shank portion having a tapered section which projects out of said housing;
a dust boot extending from a first end portion that is sealed against said housing to a second end portion;
said second end portion of said dust boot being made as a monolithic piece of a flexible material and including a first sealing feature and a second sealing feature;
said flexible material of said first sealing feature having a plurality of circumferentially spaced axially extending ribs that are in surface-to-surface contact with and sealed against said tapered section of said shank portion of said stud and has a plurality of circumferentially spaced axially extending grooves separating said ribs and wherein a lubricant can flow through said grooves between said flexible material of said dust boot and said stud;
said first sealing feature further including a plurality of circumferentially spaced radially inwardly extending relief valves, each positioned in a respective one of said grooves and sealed against said stud and extending at oblique angles relative to sad axis axially away from said housing for allowing the lubricant to pass said first sealing feature in one direction and for restricting the passage of contaminants in an opposite direction; and
said second sealing feature comprising a circumferential lip which is spaced from said first sealing feature for sealing against a vehicle suspension component.

8. The socket assembly as set forth in claim 7 wherein said second sealing feature extends three hundred and sixty degrees around said axis.

9. The socket assembly as set forth in claim 7 wherein said dust boot includes a dust boot body which is made as one integral piece of an elastomeric material.

10. The socket assembly as set forth in claim 9 wherein said dust boot further includes a Belleville washer at least partially overmolded in said first end portion of said dust boot body.

11. The socket assembly as set forth in claim 7 wherein said second sealing feature includes a notch formed in said lip for allowing a lubricant to escape said socket assembly during greasing and regreasing.

* * * * *